(12) United States Patent
Schinzel

(10) Patent No.: US 6,705,962 B2
(45) Date of Patent: Mar. 16, 2004

(54) RELOCATION DEVICE

(75) Inventor: Fred Schinzel, Männedorf (CH)

(73) Assignee: Tecan Trading AG, Mannedorf (CH)

( * ) Notice: Subject to any disclaimer, the term of this patent is extended or adjusted under 35 U.S.C. 154(b) by 78 days.

(21) Appl. No.: 10/050,457

(22) Filed: Jan. 16, 2002

(65) Prior Publication Data

US 2003/0126934 A1 Jul. 10, 2003

(30) Foreign Application Priority Data

Jan. 8, 2002 (EP) ............................................. 01810071

(51) Int. Cl.⁷ ................................................ F16H 7/18
(52) U.S. Cl. ....................... 474/140; 474/101; 474/109; 474/150; 474/153; 74/89.21
(58) Field of Search ................. 474/101, 109, 474/111, 140, 150, 152, 153, 250; 74/89.2, 89.21

(56) References Cited

U.S. PATENT DOCUMENTS

| | | |
|---|---|---|
| 4,600,358 A | 7/1986 | Graf ............................ 414/749 |
| 5,720,683 A * | 2/1998 | Patton ......................... 474/109 |
| 5,819,584 A | 10/1998 | Evans ......................... 74/89.21 |
| 6,152,811 A * | 11/2000 | Crosta ......................... 451/178 |
| 2002/0086752 A1 * | 7/2002 | Friedrich et al. ........... 474/148 |
| 2002/0165056 A1 * | 11/2002 | Ullein ......................... 474/110 |

FOREIGN PATENT DOCUMENTS

| | | | |
|---|---|---|---|
| DE | 34 33 363 | 7/1985 | ........... F16H/19/06 |
| EP | 150 058 | 1/1985 | ........... F16H/19/00 |
| EP | 0 446 977 | 2/1991 | ........... B41F/15/10 |
| FR | 2 547 635 | 6/1985 | ........... F16H/19/02 |

OTHER PUBLICATIONS

European Search Report EP 01 81 0071.

* cited by examiner

Primary Examiner—David Fenstermacher
(74) Attorney, Agent, or Firm—Womble, Carlyle, Sandridge & Rice, PLLC

(57) ABSTRACT

A drive unit of a carriage has a drive wheel and a deflector, offset parallel to a racks both of which are implemented as gearwheels, around which a closed elastic toothed belt with teeth on both sides is guided, whose inner teeth engage with the wheels described and whose outer teeth engage with the rack. A pressure block relocatable relative to the rack is positioned between the wheels, which exercises an elastic force on the part of the toothed belt facing the rack by means of a pressure surface under the influence of the part facing away from the rack, which presses the first part mentioned against the rack. In this way, a snug engagement with the rack and low-noise and uniform movement of the carriage are always ensured. A pressure wheel implemented as a pinion and engaging with the inner teeth of the toothed belt can also be used instead of the pressure block.

10 Claims, 5 Drawing Sheets

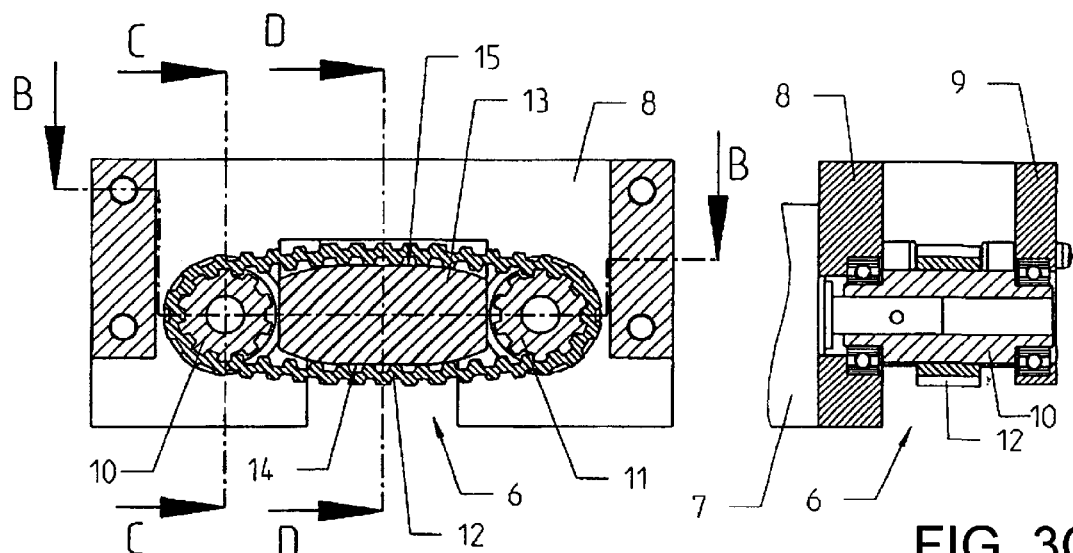
FIG. 3A
FIG. 3C
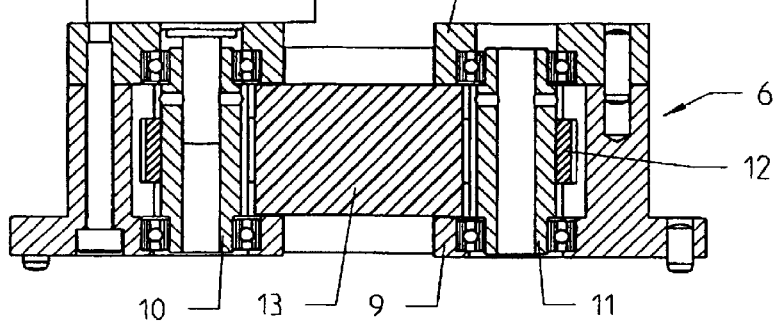
FIG. 3D
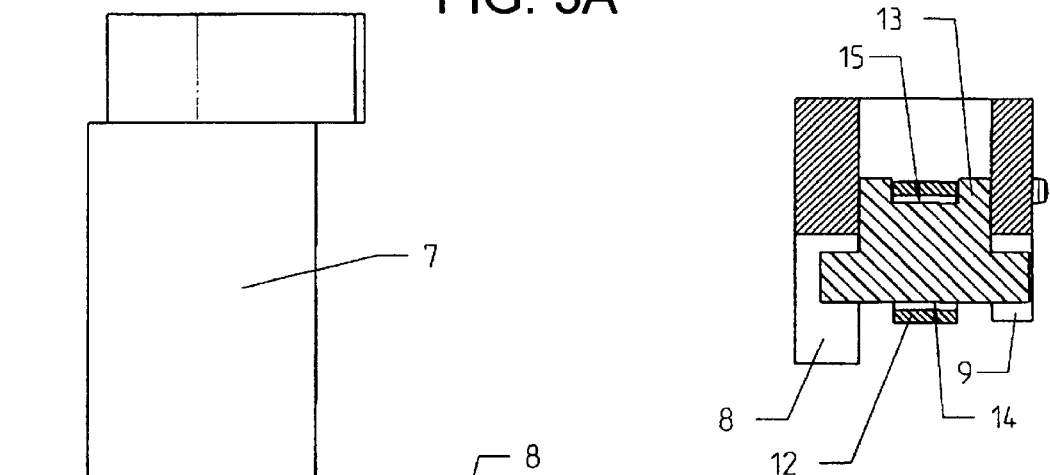
FIG. 3B

RELOCATION DEVICE

CROSS REFERENCE TO RELATED APPLICATION

This application claims the benefit of application number 01810071.9 field with the European Patent Office Jan. 8, 2002.

FIELD OF INVENTION

The present invention relates to a relocation device. These types of relocation devices can be used in various fields, such as in laboratory devices, e.g. pipettors for chemical analysis and the like.

BACKGROUND

Relocation devices are known in which the drive wheel is as a gearwheel that engages directly with the rack. However, oscillations of the distance or the angle between the rack and the axle of the drive wheel can occur, especially at greater lengths of the rack, which can lead to noise and pinching. This can impair the precision of the positioning, and the uniformity of movement, of the carriage.

SUMMARY

The present invention has the object of providing a relocation device that operates with reduced and increased reliability while ensuring non-jerky and precisely controllable movement of the carriage. Simplicity of design is an additional advantage.

The advantages of the relocation device according to the present invention, are useful for application in laboratory devices in which the criteria described above are particularly desirable. A further essential advantage, particularly for a laboratory device, is that the power transmission is maintenance-free. Therefore, the relocation device according to the present invention is particularly suitable, for example, for relocating arms carrying pipettes that can be raised and lowered, or for robot arms for handling sample tubes, microtitration plates, and similar items.

BRIEF DESCRIPTION OF THE DRAWINGS

In the following, the present invention is described in more detail with reference to figures that merely illustrate exemplary embodiments.

FIG. 3A shows a vertical longitudinal section through the drive unit.

FIG. 3B shows a horizontal longitudinal section through the drive unit along B—B in FIG. 3A and a horizontal projection of the motor.

FIG. 3C shows a transverse section through the drive unit along C—C in FIG. 3A.

FIG. 3D shows a transverse section through the drive unit along D—D in FIG. 3A.

DESCRIPTION OF THE INVENTION

Figure 1:
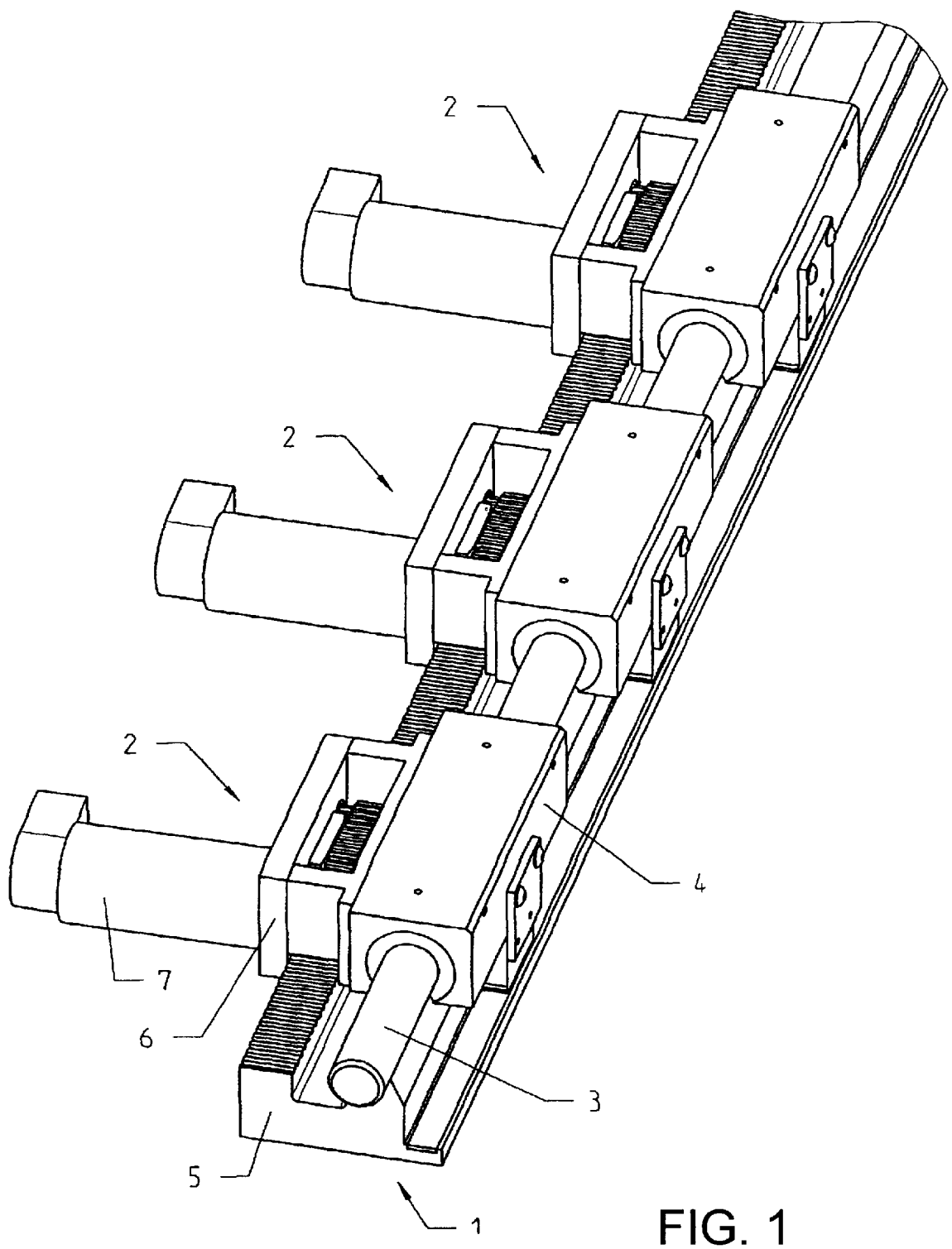
FIG. 1 shows a perspective view of a relocation device according to the present invention having multiple carriages.

The relocation device according to the present invention has, as shown in FIG. 1, a guide 1 along which one or multiple carriages 2 can be relocated. Guide 1 comprises a guide rail, implemented as a guide rod 3 optionally with a round cross-section, with which each of the carriages 2 engages by means of a slide 4. A rack 5 having teeth pointing upward runs parallel to guide rod 3. Each of the carriages 2 has a drive unit 6 adjoining slide 4 and a motor 7 adjoining the drive unit 6 for driving it.

Figure 2:
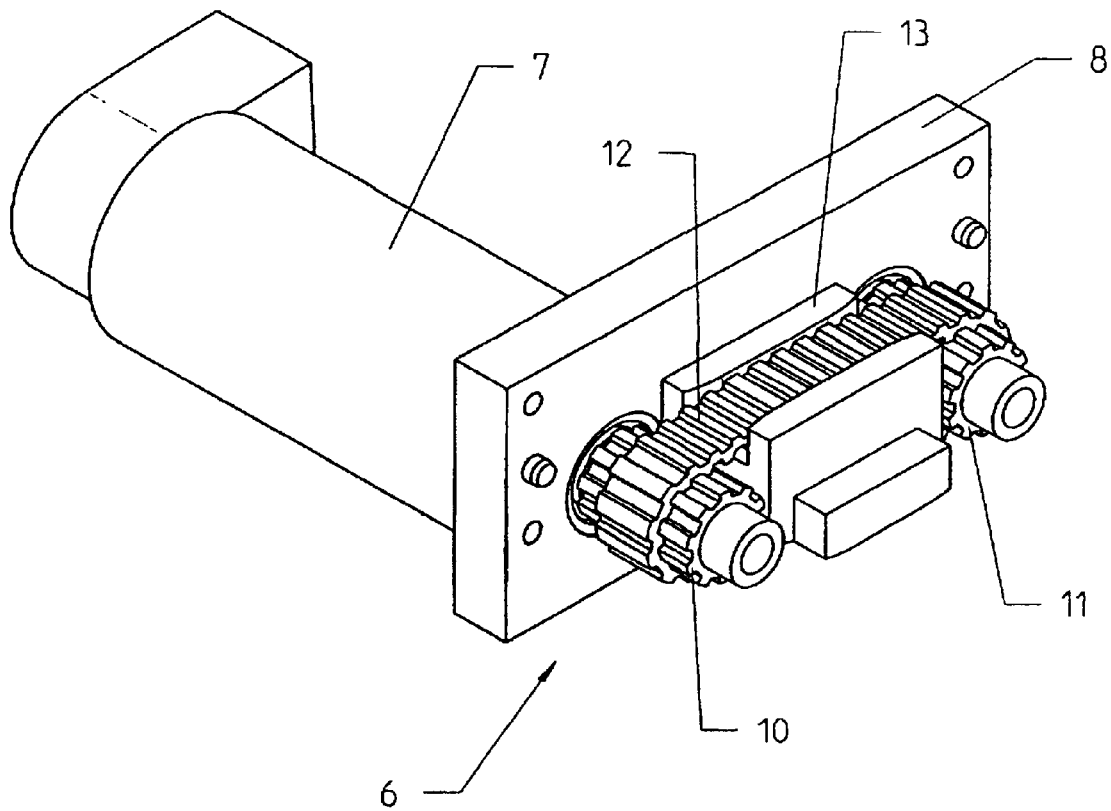
FIG. 2 shows a perspective view of a motor and a part of a drive unit of a carriage of the relocation device according to the present invention as shown in FIG. 1 with parts of the housing removed.
Figure 4:
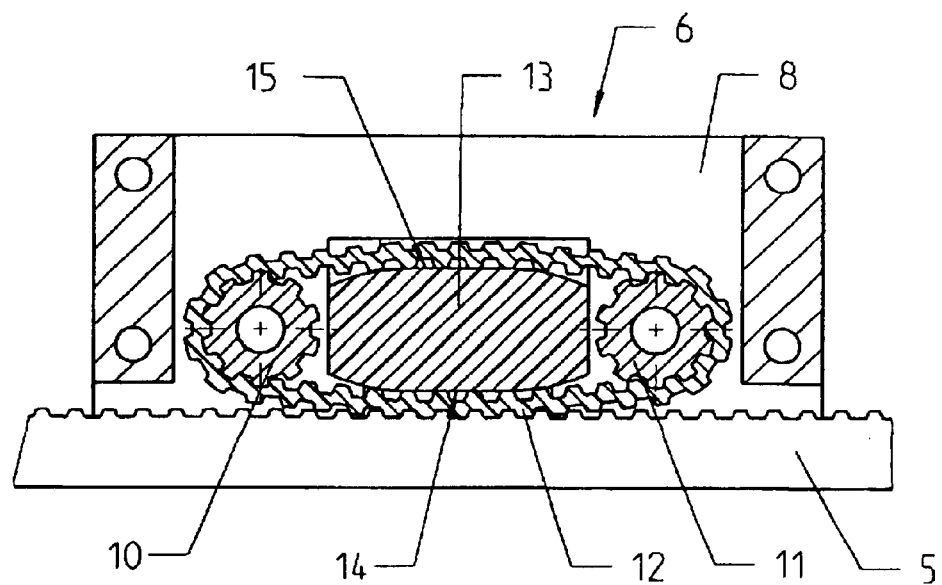
FIG. 4 shows a part of the relocation device according to the present invention with a vertical longitudinal section through the drive unit.

As shown in FIGS. 2 and 3, drive unit 6 comprises a housing with a base plate 8 and a parallel cover plate 9 at a distance from the base plate 8, a drive wheel 10, that may be a toothed drive wheel, and disposed between the plates as a gearwheel with an axel. The axel is affixed to the axle of motor 7 and is driven by the motor. A deflector 11, which may be a wheel, may be, but not necessarily, identical to drive wheel 10. The deflector 11 may also be a toothed gearwheel, and is positioned offset in the lengthwise direction of rack 5 relative to drive wheel 10, and is also located between base plate 8 and cover plate 9. Drive wheel 10 and deflector 11 are both rotatable in the housing. A toothed belt 12 made of an elastic material, e.g. a plastic such as polyurethane, runs around drive wheel 10 and deflector 11, and has inner teeth which engage with the wheels described and outer teeth which engage with the teeth of rack 5 as shown in FIG. 4.

A pressure device is located between the drive wheel 10 and deflector 11 comprising the drive unit 6, wherein the pressure device may be a non-twistable pressure block 13 which is only in contact with the toothed belt 12, except for stops which restrict its relocatability parallel to rack 5 and parallel to the axels of the wheels. Pressure block 13, which is made of a material with good sliding properties, preferably a suitable plastic such as ultrahigh molecular weight high density polyethylene, has a first pressure surface 14 with which it presses against the lower part of toothed belt 12 laying opposite rack 5. The first pressure surface 14 may have a planar straight central section which overlaps with multiple, e.g. three or four, teeth of the outer teeth of toothed belt 12 and smooth convex curved sections adjoining the planar central section. A second pressure surface 15, which is positioned somewhat countersunk for the purpose of lateral guiding of toothed belt 12, contacts with the adjacent inner of the toothed belt 12, but facing away from rack 5.

In the center of the pressure block 13, the distance between the first pressure surface 14 and counter surface 15 is somewhat greater than the inner radius, i.e. the radius not including the teeth, of drive wheel 10 and deflector 11. In addition, the distance between the axels of the wheels described is dimensioned in such a way that the toothed belt 12 is slightly elastically stretched. In this way, the upper part of the belt exercises an elastic force on the second pressure surface 15 of the pressure block 13, so that the first pressure surface 14 in turn exercises an elastic force on the central section of the lower part of toothed belt 12 directed toward rack 5, which presses this section against rack 5. The drive unit 6, particularly the arrangement comprising a drive wheel 10, deflector 11, toothed belt 12, and pressure block 13, is essentially symmetrical relative to a vertical plane lying in the center, between the axles of the wheels described.

In operation, carriages 2 are each driven independently from one another by appropriate control of motors 7 and carriages 2 are relocated along guide 1. At the same time, in a way independent from the movement direction, the lower part of toothed belt 12, when it comes into contact with the current forward convex section of the first pressure surface 14, slides further over it, and is pressed against rack 5 so that the engagement of its outer teeth with the rack strengthens continuously toward the center of drive unit 6, remains uniform over a short section, and then diminishes continuously again. Variation in friction between the teeth and corresponding noises and irregularities of the movement are thus largely avoided. Because of the force directed toward rack 5, which the first pressure surface 14 exercises on toothed belt 12, there is a reliably snug engagement between the toothed belt 12 and rack 5, even when the vertical distance between drive wheel 10 and rack 5 varies. The elasticity of toothed belt 12 also has a noise-damping and compensating effect. Since it only comes in contact with smooth pressure surface 14 and identically implemented counter surface 15, there is hardly any wear on the toothed belt.

Figure 6:
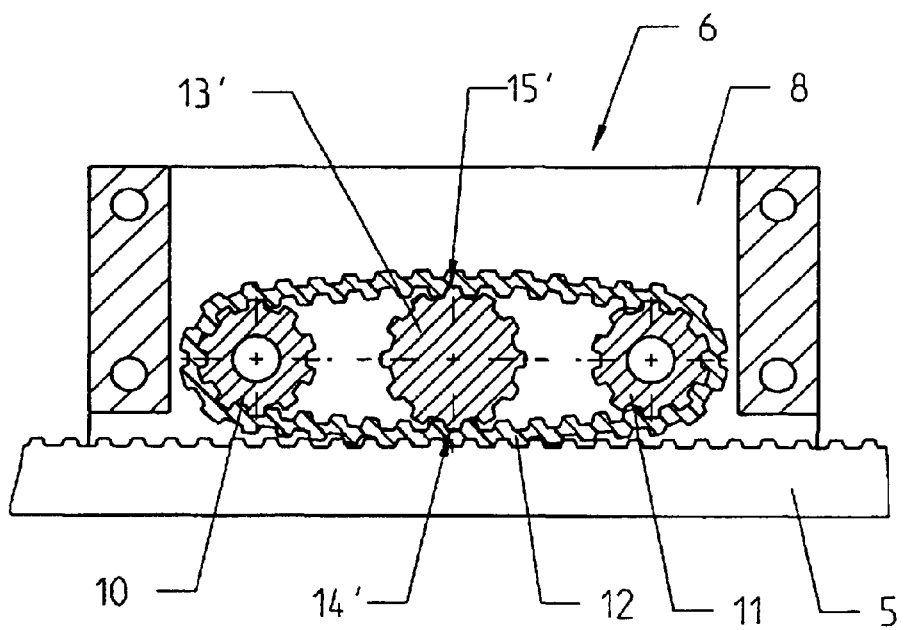
FIG. 6 shows a part of the relocation device according to the present invention according to the altered embodiment with a vertical longitudinal section through the drive unit.
Figure 5B:
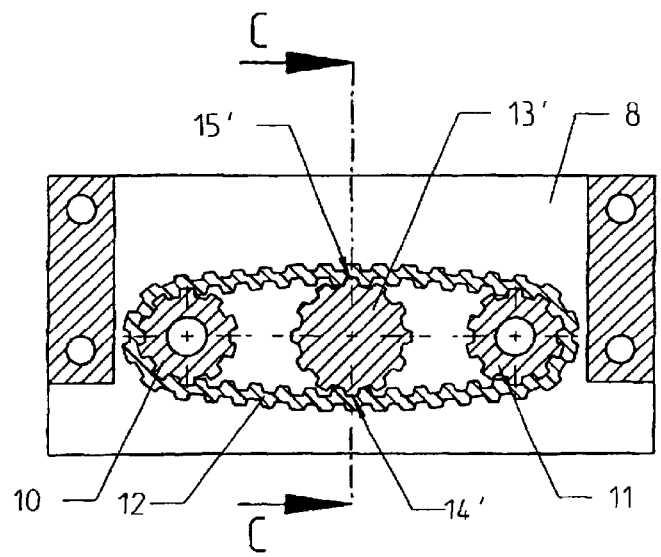
FIG. 5B shows a vertical longitudinal section through the drive unit along B—B in FIG. 5A.
Figure 5C:
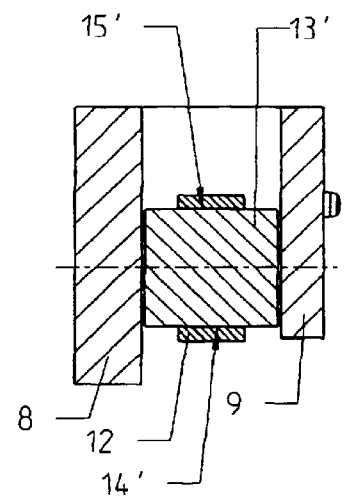
FIG. 5C shows a transverse section through the drive unit along C—C in FIG. 5B.
Figure 5A:
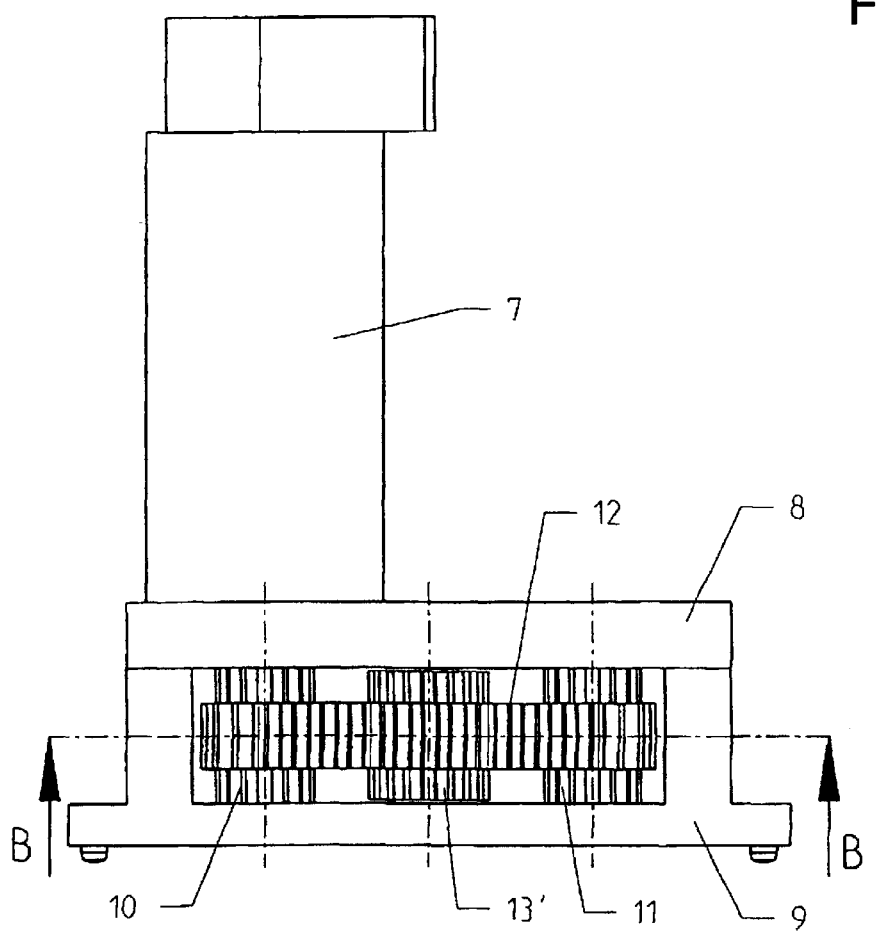
FIG. 5 shows a horizontal projection of the drive unit and the motor of a carriage according to an altered embodiment of the relocation device according to the present invention shown in FIG. 1.

In yet another embodiment of the drive unit 6 (FIGS. 5A–C), the pressure device is a pressure wheel 13', such as a toothed pinion, which is rotatably positioned between the upper and lower part of toothed belt 12 and whose teeth engage with the upper and lower inner teeth of the belt. Otherwise, its axial relocatability is delimited by the stops formed by base plate 8 and cover plate 9. Since its diameter is somewhat larger than that of drive wheel 10 and deflector 11, the toothed belt 12 is elastically stretched and it again transmits the elastic force (see also FIG. 6), which the upper part of the toothed belt 12 exerts to its current counter surface 15' (the section of its toothed belt 12 in contact with the upper part of the pressure device) and to the opposing current pressure surface 14' (the section of its circumferential surface currently in contact with the lower part of the pressure device), the central section of which presses against rack 5. In this case as well, first pressure surface 14' and second counter surface 15' are essentially convex i.e., except for the teeth, and the pressure surface therefore causes a gradual engagement of the outer teeth of toothed belt 12 with the teeth of rack 5. The position of the pressure wheel 13' in drive unit 6 is fixed against relocation parallel to rack 5 by the engagement with toothed belt 12. Therefore, no stops or the like are necessary in this direction.

Various alterations of the exemplary embodiments described are possible. This is ensured by a pressure device that maintains engagement and compensates for any type of oscillation of the distance to the rack, which is decoupled from the drive so that a simple fixed-axis mounting of the drive wheel suffices.

What is claimed is:

1. A relocation device comprising a rack and at least one carriage moveably disposed thereon, the at least one carriage having a drive unit, wherein the drive unit has a toothed drive wheel operably engaged to a motor, a deflector, a closed toothed belt, and a pressure device having a first pressure surface and a second pressure surface, wherein the distance between the first and the second pressure surfaces is greater than the individual inner diameter of at least one of the toothed drive wheel and the deflector, and wherein the toothed belt is elastically stretchable and has an inner toothed surface and an outer toothed surface, said inner toothed surface operably engaging the toothed drive wheel and the deflector, and the outer toothed surface of the toothed belt operably engaging the rack, and wherein the pressure device is moveably disposed to convert a tension force produced in the elastically stretchable toothed belts by mounting it in an elastically stretched state into a pressure directed onto the inner surface of the toothed belt and in the direction of the rack, wherein the first pressure surface is disposed to direct a pressure onto the inner surface of the toothed belt in the direction of the rack and wherein the second pressure surface is disposed to receive a pressure from the elastically stretched toothed belt and direct said pressure to the first pressure surface and in a direction of the rack.

2. The relocation device according to claim 1, wherein the pressure device is located between the rotatable drive wheel and the deflector and is movable in essentially perpendicular direction to the rack.

3. The relocation device according to claim 2, wherein the pressure device is a rotatable pressure wheel having a diameter greater than the individual inner diameter of at least one of the toothed drive wheel and the deflector.

4. The relocation device according to claim 3, wherein the pressure wheel is a toothed pinion engaging with the inner teeth of the toothed belt.

5. The relocation device according to claim 3, wherein the pressure wheel is mounted on an axle.

6. The relocation device according to claim 2, wherein the deflector is a deflector wheel rotatably mounted on the drive unit and offset from the toothed drive wheel in the direction of the rack.

7. The relocation device according to claim 2, wherein the pressure device is a non-rotatable pressure block, and wherein the first pressure surface has at least two convex sections and a planar section, which planar section overlaps with a plurality of teeth on the outer surface of the toothed belt.

8. The relocation device according to claim 7, wherein the second pressure surface has at least two convex sections and a planar section, which planar section overlaps with a plurality of teeth on the outer surface of the toothed belt.

9. The relocation device according to claim 1 which has a plurality of carriages moveably disposed thereon.

10. The relocation device according to claim 9, further comprising a guide rail and a guide rod, wherein each one of the independently moving carriages has a drive unit and a slide, the slide slidably engaging with the guide rod.

* * * * *

UNITED STATES PATENT AND TRADEMARK OFFICE
CERTIFICATE OF CORRECTION

PATENT NO. : 6,705,962 B2
DATED : March 16, 2004
INVENTOR(S) : Fred Schnizel

It is certified that error appears in the above-identified patent and that said Letters Patent is hereby corrected as shown below:

Title page,
Item [73], Assignee, replace "Mannerdorf" with -- Männerdorf --
Item [30], Foreign Application Priority Data, replace "January 8, 2002" with -- January 25, 2001 --

Signed and Sealed this

Twenty-second Day of June, 2004

JON W. DUDAS
*Acting Director of the United States Patent and Trademark Office*